Oct. 6, 1959   F. H. WEBB   2,907,462
WATER SOFTENING APPARATUS
Filed Dec. 5, 1955   3 Sheets-Sheet 1
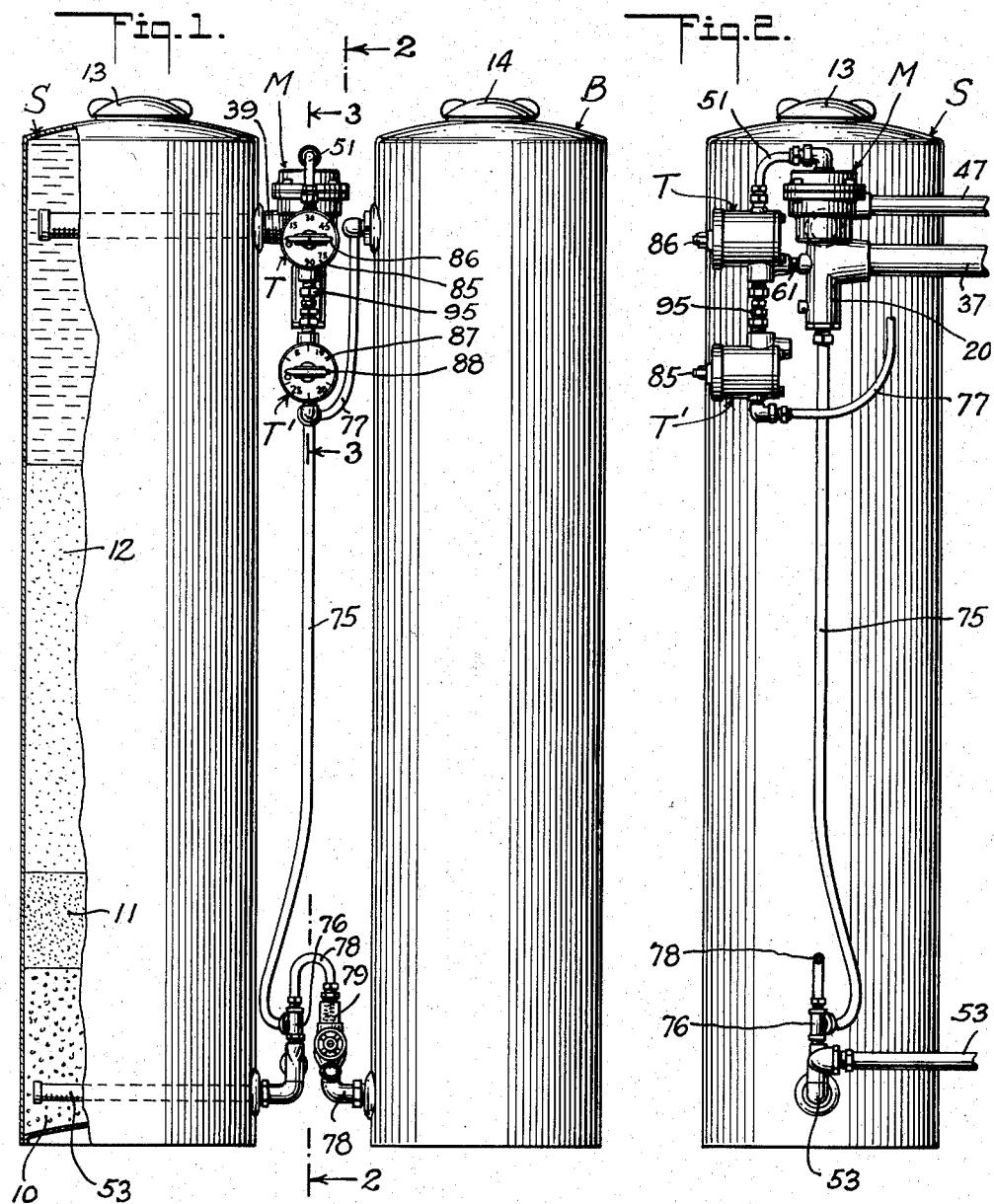
INVENTOR.
FRANCIS H. WEBB
BY
Frederick Diehl
ATTORNEY

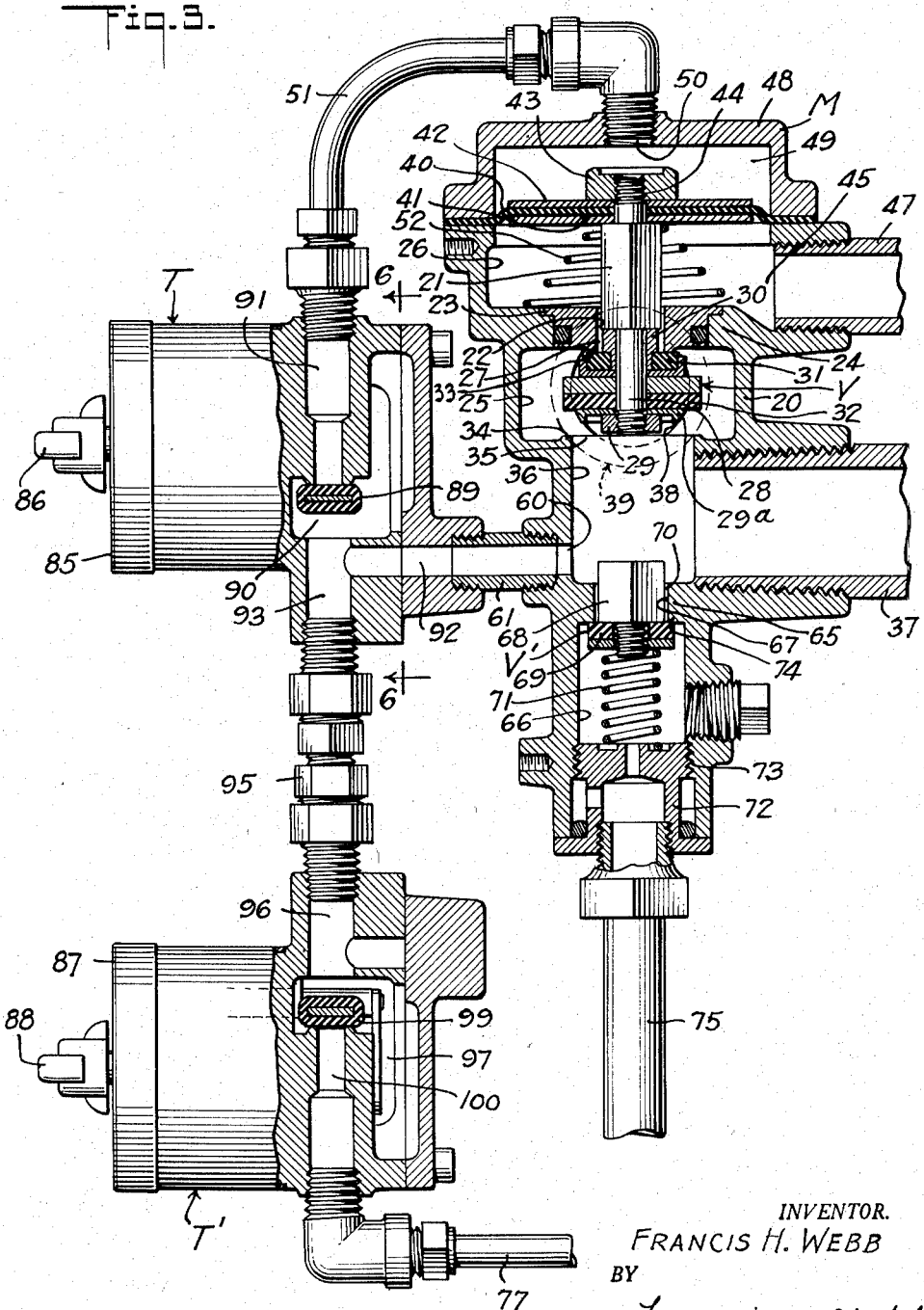

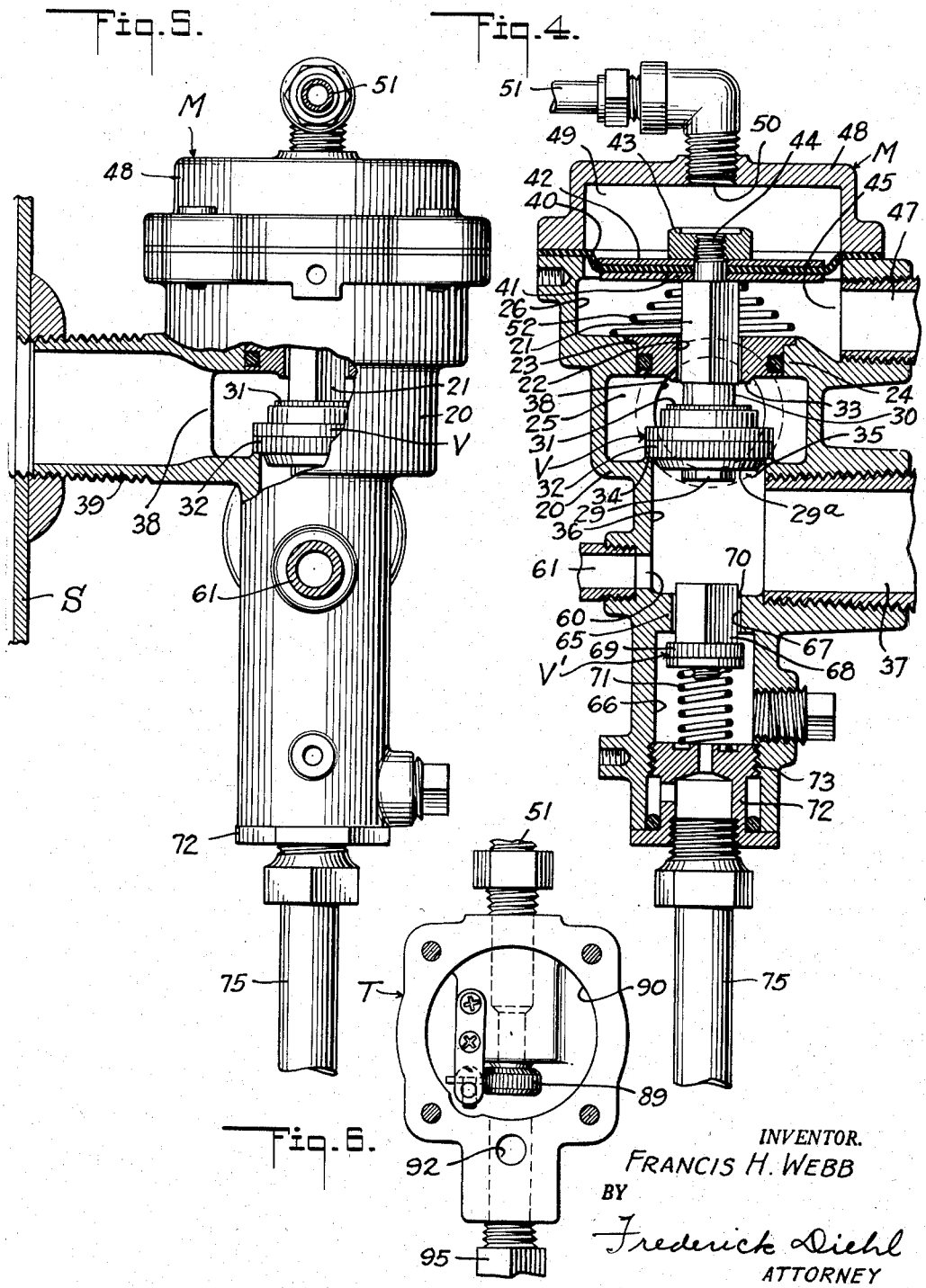

United States Patent Office 2,907,462
Patented Oct. 6, 1959

---

2,907,462

WATER SOFTENING APPARATUS

Francis H. Webb, Pasadena, Calif.

Application December 5, 1955, Serial No. 550,923

2 Claims. (Cl. 210—140)

My invention relates generally to water softening apparatus of the character embodied in my United States Letters Patent No. 2,670,328, issued January 15, 1954, and in my co-pending application Serial No. 328,584, filed December 30, 1952, now Patent No. 2,744,867, issued May 8, 1956.

In the patent and application above referred to, the inventions thereof disclose and claim means to automatically regenerate the exchanger bed at predetermined time intervals to insure a continuous supply of soft water; embody a pressurized and sealed brine tank eliminating the danger of overflowing and flooding the premises; which eliminates floats and float valves in the brine tank; which eliminates an injector to raise brine from the brine tank and deliver the brine to the exchanger bed; which is quickly adjusted to regenerate at any desired time interval, and has sufficient storage capacity for salt to care for the needs of the average family for an entire year; and which completely isolates the brine tank from the softener tank except during regeneration.

An object of my present invention is to provide a water softening apparatus embodying all of the above stated features including a master valve characterized by its structural simplicity and its adaptability for use with both pressure and open brine tanks; single or double tank installations; and freedom from pressure and back pressure problems as well as from drain line troubles.

Another object of my invention is to provide a water softening apparatus embodying a master valve of the above described character which has cushioned opening and closing operations and is equally well adapted for use with automatic electric time switches; with manually set, automatically operating mechanical timers for the rinsing and brining operations; or with manually opened and closed cocks controlling the regenerating period.

With these and other objects in view, my invention resides in the combinations, arrangements and functional relationships of elements as set forth in the following specification and particularly pointed out in the appended claims.

In the accompanying drawings,

Figure 1 is a view in side elevation, partly in section, illustrating one form of water softening apparatus embodying this invention;

Figure 2 is a vertical sectional view taken on the line 2—2 of Figure 1;

Figure 3 is an enlarged vertical sectional view taken on the line 3—3 of Figure 1 and showing the master valve in service position;

Figure 4 is a view of the master valve similar to Figure 3, with the valve in regenerating position;

Figure 5 is a view of the master valve in side elevation and partly in section to illustrate the connection of the valve to the softener tank; and Figure 6 is a sectional view taken on the line 6—6 of Figure 3.

Referring specifically to the drawings, my invention in its illustrated embodiment broadly comprises a softener tank S, a brine tank B, a master valve M, and regenerating and brine timers T and T', respectively, which timers illustrate one form of device for controlling the operation of the master valve.

The softener tank S is provided with a bottom layer of gravel 10 on which is placed a layer of filtering sand 11, above which latter is an exchanger bed 12 of the resin type. The tanks S and B are provided with top filling openings adapted to be closed fluid-tight by caps 13 and 14, respectively. The usual softener salt is supplied to the brine tank B for mixing with sufficient water to make a saturated solution.

The master valve M comprises a body 20 containing a double valve element V and a single valve element V', the former of which includes a stem 21 of square or other non-circular form in cross section to work freely through a circular opening 22 in a seat member 23 of large diameter fitted in a partition or wall 24 separating a valve chamber 25 and a drain chamber 26 from each other. The stem 21 and opening 22 co-act to provide a drain port 27 around the stem communicating with the chambers 25 and 26.

Secured on a reduced and threaded shank 28 of the stem 21 by a nut 29 between a shouldered shear ring 30 and a recessed washer guide 29a are valves 31 and 32 which work in the chamber 25 and co-act, respectively, with an annular seat 33 on the seat member 23 surrounding the port 27 and an annular seat 34 surrounding a port 35 of an inlet chamber 36 to which is connected a pipe 37 from the usual domestic source of hard water under pressure. The chamber 25 is provided with a hard water outlet 38, which, by means of a pipe 39, connects such chamber to the top of the softener tank S.

Closing an open side of the chamber 26 opposite the partition 24 is a flexible diaphragm 40 secured to the other end of the stem 21 between a washer 41 and a backing disk 42 by means of a nut 43 threaded on a shank 44 of reduced diameter on the stem. The chamber 26 is provided with an outlet port 45, which by means of a pipe 47 is connected to the usual drain or sewer line. The diaphragm 40 is secured to the body by a cup shaped cap 48 which co-acts with the diaphragm to form a pressure chamber 49 having an inlet port 50 connected by means of a pipe 51 to the regenerating timer T.

A conical coil spring 52 urges the diaphragm and hence the valves 31 and 32 to the one extreme or service position shown in Figure 3 wherein the valve 31 closes the port 27 and the valve 32 opens the port 35 to permit the flow of hard water from the supply pipe 37 into the softener tank S so as to be rendered soft by the exchanger bed 12 before being discharged from the bottom of the softener tank and delivered by a pipe 53 to the house lines for use.

The chamber 36 is provided with an outlet 60 connected by a pipe 61 to the regenerating timer T to supply hard water to the pressure chamber 49 in a manner to be later described in detail, all so as to move the valves 31 and 32 against the action of the spring 52 to the other extreme or regenerating position shown in Figure 4.

A partition or wall 65 separates the inlet chamber 36 from a valve chamber 66, and is provided with a circular opening 67 in which freely works the stem 68 of a valve of the valve element V'. The stem 68 is square or of other non-circular form in cross section for co-action with the opening 67 in providing a rinse port 70 through the partition 65. A coil spring 71 in the chamber 66 engages the valve 69 and a hollow plug 72 threaded into the chamber at 73, to urge the valve into engagement with an annular seat 74 bounding the port 70, all so as to seal off the valve chamber 66 from the inlet chamber 36.

Connected to the plug 72 is one end of a pipe 75 the other end of which is connected by a T fitting 76 to the pipe 53 to enable the counterflow of rinse water to be delivered to the bottom of the softener tank S as will be later fully described. A pipe 77 connects the brine timer T' to the brine tank B adjacent to the top thereof, whereas a pipe 78 having a check valve 79 connects the brine tank at the bottom thereof to the bottom of the softener tank S through the medium of the fitting 76, to enable the counterflow of brine to be effected through the softener tank with the rinse water to regenerate the softener tank as will be described in the operation of the invention.

The timers T and T' which have been illustrated as one form of control for the operation of the master valve M are not claimed per se as they are of standard manufacture by the Erie Mfg. Co. of Milwaukee, Wis., under the name "Time-O-Flow" and are well known to those skilled in the art. For the purpose of my invention a brief description of the construction and operation of these timers in conjunction with the master valve M will suffice for the disclosure on which the claims are based. These timers each embody a clock mechanism (not shown) manually set for a predetermined time interval, the timer T having a dial 85 graduated for a maximum time interval of 90 minutes, with which a spring winding, rotatably mounted indicating knob 86 co-acts, whereas the timer T' is provided with a dial 87 graduated for a maximum time interval of 30 minutes, with which a similarly functioning knob 88 co-acts.

The operation of rotably adjusting the knob 86 to set the timer T for a predetermined time interval opens a spring-closed valve 89 working in a valve chamber 90 of the timer and controlling an outlet 91 of the chamber 49 to which the pipe 51 is connected as clearly shown in Figure 3. The valve chamber 90 is provided with an inlet 92 connected by the pipe 61 to the outlet 60 of the inlet chamber 36 of the master valve M for the delivery of hard water to the valve chamber 90 and to a second outlet 93 of the latter.

From the outlet 93 extends a pipe connection 95 to an inlet 96 of a similar valve chamber 97 of the timer T'. The operation of rotatably adjusting the knob 88 to set the timer T' for a predetermined time interval opens a valve 99 controlling an outlet 100 of the chamber 97, to which the pipe 77 is connected.

The operation of the invention is as follows:

With the valve elements V and V' in the service position shown in Figure 3, the timer valves 89 and 99 are closed, and hard water from the usual domestic supply under pressure will be free to flow through the pipe 37, inlet chamber 36, inlet 35, chamber 25, outlet 38 and pipe 39 into the top of the softener tank S, then downwardly through the exchanger bed 12, sand 11 and gravel 10, so as to be rendered soft by the chemical reaction of the bed 12, then through the pipe 53 for distribution to various parts of the building.

Whenever it is necessary to regenerate the softener tank S as will be determined by the amount of water used as well as by the hardness of the water, the knobs 86 and 88 are adjusted for example, to indicate 60 minutes and 5 minutes, respectively, so as to open the respective timer valves 89 and 99. Water from the supply pipe 37 will now be delivered to the pressure chamber 49 by flowing through the outlet pipe 61, inlet 92 of of the timer T, valve chamber 90, outlet 91 and pipe 51, so as to act upon the diaphragm 40 and move the valve element V to the regenerating position shown in Figure 4 wherein the drain port 27 will be opened and the port 35 closed, thus discontinuing the supply of hard water to the top of the softener tank  This operation of the valve element V produces a pressure drop at the top of the softener tank which causes the valve element V' to be actuated by the water pressure in the chamber 36 so as to open the port 70 and effect the counterflow of rinse water through the pipe 75, fitting 76 and pipe 53 upwardly through the softener tank, pipe 39, chamber 25, drain port 27 and chamber 26 into the drain pipe 47.

Concurrently, hard water from the inlet chamber 36 is admitted to the top of the brine tank B through the outlet 60, pipe 61, inlet 92 of the timer T, outlet 93, pipe connection 95, inlet 96 of the time T', valve chamber 97, outlet 100, and pipe 77, so as to force the saturated solution of brine from the bottom of the brine tank through the pipe 78, check valve 79, and finally through the pipe 53 so as to mix with the rinse water from the pipe 75 and enter the bottom of the softener tank to effect the upward or counterflow of the mixture through the softener tank, pipe 39, chamber 25, drain port 27 and chamber 26 into the drain pipe 47.

When 5 minutes have elapsed, the clock mechanism of the brine timer T' closes the valve 99 so as to discontinue the flow of brine from the brine tank. However, the flow of rinse water continues as aforestated, so as to force the brine through the softener tank, carrying with it all foreign matter filtered from the water during service. When 60 minutes have elapsed, the clock mechanism of the regenerating timer T closes the valve 89, thus relieving the water pressure upon the diaphragm 40 and permitting the spring 52 to restore the valve element V to its service position shown in Figure 3 to again connect the hard water supply pipe 37 to the top of the softener tank S and close off the drain line from the latter.

As the pressure in the softener tank is now equalized, the spring 71 restores the valve element V' to its closed position shown in Figure 3 to thus seal off the hard water from leakage to the soft water side of the softener tank. As the brine tank B is now subjected to a negative pressure and full pressure is acting against the check valve 79, the transference of brine from the brine tank B to the soft water line 53 is positively prevented.

I claim:

1. In a water softening apparatus, a body having a valve chamber provided with a hard water inlet from a source of supply, a hard water outlet to a softener tank, a drain port to a drain line, and a rinse and by-pass port communicating with said inlet; a first valve element working in said chamber to open said inlet and close said drain port or vice versa in accordance with whether said element occupies a service position or a regenerating position; means urging said element to the service position; means for actuating said element to move same to the regenerating position; a second valve element controlling said rinse port; and means urging said second valve element to normally close said rinse and by-pass port, said second valve element being movable by the pressure of said hard water against said urging in response to a pressure drop in said softener tank when said first valve element is in said regenerating position, whereby said rinse port is opened for the counterflow of rinse water through the softener tank to said outlet and drain port into the drain line; a first timer means having an inlet connected to said body to receive hard water from said supply, and provided with an outlet, said first timer means having a clock-controlled valve normally closing the timer means valve outlet and operable to maintain the latter open for a period of time predetermined by setting of the timer clock, so as to subject said actuating means to the action of water from said supply and cause said valve element to open said drain port and close said hard water inlet port for a predetermined time; and a second timer means having an inlet connected to said body to receive water from said hard water supply and having an outlet port connected to an inlet of a brine tank, said second timer means having a clock-controlled valve normally closing its outlet and operable to maintain the outlet open for a period of time predetermined by setting of the second timer means, whereby brine is forced from the brine tank into the softener tank by the rinse water to effect regeneration of the softener tank.

2. In water softening apparatus a master valve comprising a body having a partition provided with a drain port and separating the body into a valve chamber and a drain chamber having a drain outlet for connection to a drain line; said valve chamber having a hard water inlet for connection to a supply line, and a hard water outlet for connection to a softener tank; a first valve element working in said valve chamber; means urging said element to a service position wherein the element closes said drain port and opens said hard water inlet for the flow of hard water from the supply line through said hard water outlet to the softener tank; said body defining a pressure chamber; a flexible diaphragm interposed between said pressure chamber and valve chamber and operatively connected to said valve element to move the latter to a regenerating position wherein said drain port will be opened and said hard water inlet will be closed when water from the supply source acts upon said diaphragm; said body having a rinse and by-pass port communicating with said hard water inlet; a second valve element controlling said rinse and by-pass port; and means urging said second valve element to close the rinse port and responsive to softener tank pressure to yield to water pressure imposed on said second valve element when the first said valve element is in said regenerating position, to permit the second valve element to be opened for the counterflow of rinse water through the softener tank and from said hard water outlet to the drain line; first timer means having an inlet connected to said body to receive water from the supply and provided with an outlet; said timer means having a clock-controlled valve normally closing the timer means outlet and operable to maintain the latter outlet open for a period of time predetermined by setting of the timer means, so as to subject said diaphragm to the pressure of the hard water acting thereon through said timer means outlet, thereby moving said first valve element to said regenerating position to open said drain port and close said hard water inlet for a predetermined time to effect regeneration of the softener tank; and a second timer means having an inlet connected to said body to receive water from said hard water supply and having an outlet port connected to an inlet of a brine tank, said second timer means having a clock-controlled valve normally closing its outlet and operable to maintain the outlet open for a period of time predetermined by setting of the second timer means, whereby brine is forced from the brine tank into the softener tank by the rinse water to effect regeneration of the softener tank.

References Cited in the file of this patent

UNITED STATES PATENTS

| | | |
|---|---|---|
| 1,910,011 | Griswold et al. | May 23, 1933 |
| 2,265,225 | Clark | Dec. 9, 1941 |
| 2,486,608 | MacDougall | Nov. 1, 1949 |
| 2,539,748 | Mueller | Jan. 30, 1951 |
| 2,631,665 | Perrin | Mar. 17, 1953 |
| 2,689,218 | Waugh | Sept. 14, 1954 |
| 2,698,292 | Mueller | Dec. 28, 1954 |
| 2,699,207 | Russell et al. | Jan. 11, 1955 |